A. C. FREEMAN, Jr.
GLARE SHIELD FOR AUTOMOBILES.
APPLICATION FILED SEPT. 12, 1916.
1,225,608.
Patented May 8, 1917.
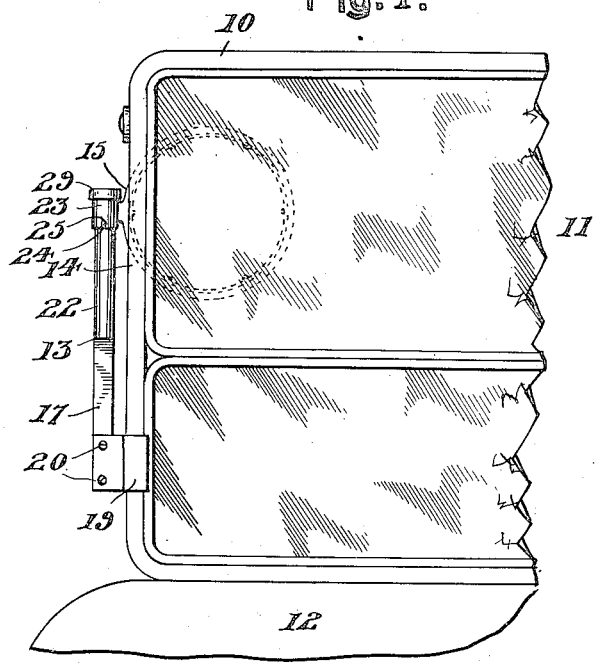
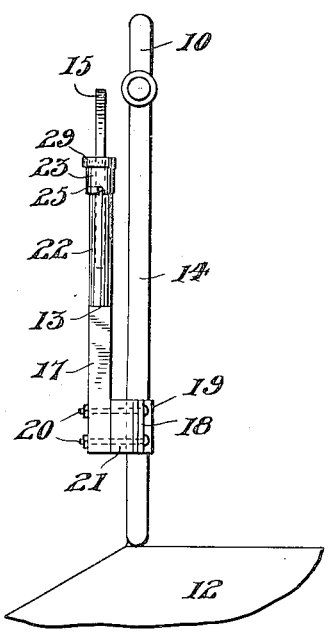
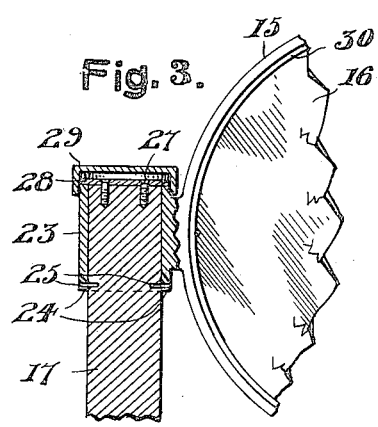
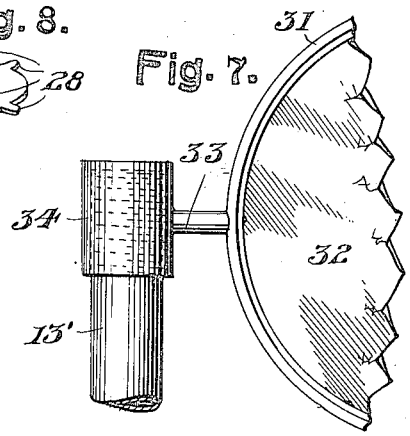
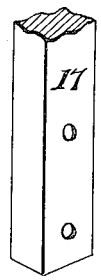
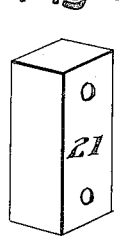
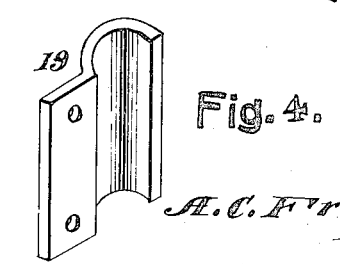
Inventor
A. C. Freeman, Jr.
By T. R. Bryant
Attorney

UNITED STATES PATENT OFFICE.

ARTHUR C. FREEMAN, JR., OF NORFOLK, VIRGINIA.

GLARE-SHIELD FOR AUTOMOBILES.

1,225,608.  Specification of Letters Patent.  Patented May 8, 1917.

Application filed September 12, 1916. Serial No. 119,761.

*To all whom it may concern:*

Be it known that I, ARTHUR C. FREEMAN, Jr., a citizen of the United States, residing at Norfolk, in the county of Norfolk and State of Virginia, have invented certain new and useful Improvements in Glare-Shields for Automobiles, of which the following is a specification.

This invention relates to certain new and useful improvements in glare shields for automobiles.

The primary object of the invention is the provision of a device that is easy and inexpensive to manufacture adapted as an attachment for automobiles for preventing the driver thereof from being affected by the blinding headlights of other machines.

A further object of the invention is the provision of an auxiliary shield of cloudy glass readily mounted upon the wind-shield of an automobile in a position for viewing any dazzling light such as those of automobile head-lights or search-lights.

It is well known that the usual construction of head-lights upon vehicles have caused many accidents by blinding and dazzling the eyes of the drivers of other vehicles and the present device is designed for preventing the same by an appliance attached to the wind-shield and through which an undazzled vision may be readily obtained by the driver by slightly shifting the position of his head while looking through the usual wind-shield.

In the drawing forming a part of this application and in which like designating characters refer to corresponding parts throughout the several views:—

Figure 1 is a rear elevation of a portion of the wind-shield and dash-board of an automobile with the present device attached to the wind-shield.

Fig. 2 is a side elevation thereof.

Fig. 3 is an enlarged sectional view through the upper portion of the device with the viewing member broken away.

Fig. 4 is a perspective view of one of the clamp members detached.

Fig. 5 is a perspective view of a filler block.

Fig. 6 is a perspective view of the lower portion of the supporting rod.

Fig. 7 is a view similar to Fig. 3 shown in elevation illustrating a modified form of mounting means, and, Fig. 8 is a perspective view of the resilient member detached.

Referring more in detail to the drawing, it will be understood that the present glare preventing shield is designed as an attachment for any convenient portion of a vehicle, the same being herein illustrated in connection with the frame 10 of the wind-shield 11 of an automobile 12.

The device broadly consists of a mounting rod 13 removably attached to the side member 14 of the wind-shield frame and having a mount or ring 15 carried adjacent the top thereof for suitably positioning a shield 16. The shield 16 is preferably formed of cloudy glass functioning similarly to a smoked glass in preventing the passage of the direct rays of light therethrough but being sufficiently transparent to allow visual access through the same.

The rod 13 has a squared lower portion 17 and is attachable to the wind-shield member 14 by means of a two-part clamp 18, each portion being of the form illustrated at 19. The clamp members embracing the side member 14 are secured to the rod end 17 preferably by means of bolts 20 while one or more spacing positioning blocks 21 of desired thickness are arranged between the clamp 18 and the said rod. By this arrangement, the rod 13 may be off-set a desired distance at either side of the wind-shield 11 although the same is preferably positioned as shown in Figs. 1 and 2 of the drawing in advance thereof.

The upper cylindrical portion 22 of the rod 13 accommodates the sleeve or carrying member 23 attached to the mounting ring 15 journaled upon the said rod, four notches 24 being arranged in the lower end of the sleeve 23 positioned ninety degrees apart and adapted to receive the four pins 25 therein. The said pin radially projects at distances of ninety degrees apart from the rod portion 22 whereby the shield mount 15 may be positioned at any of the four adjustments desired.

A resilient washer 26 is mounted upon the upper end of the rod 13 by means of one or more screws 27 and is provided with radially projecting resilient fingers 28 projecting over the upper edge of the sleeve 23. The resiliency of the washer or disk 26 and its fingers allow the sleeve 23 to be moved upwardly unseating the slots 24 from the pins 25 allowing the sleeve and glare shield to be given a quarter turn and then returned to its locked position. The depth of the said slots and diameter of the said pins being limited to allow the resilient member 26 to perform the above-named functions, the device is readily adjusted when desired without releasing any screws or other members. A cap 29 may be provided for overlying the washer 26 being herein illustrated of cap-form screw-threaded exteriorly upon the upper end of the sleeve 23. It will be evident that the rod 13 may be of any form desired which is also true of the clamp 18, the said rod being either tubular or of solid formation. The employment of two screws 27 insures the washer 26 from relative rotation.

The shield 16 is retained in the ring 15 by means of a band 30 and such mounting band and shield may be of any form desired such as oval, square, or circular as herein shown while any semi-transparent material such as pyroxylin may be employed if desired. It will be also understood that the present shield may be rigidly fixed to the mounting rod 13 as shown in Fig. 7 of the drawing and in which the mount 31 for the shield 32 is maintained in spaced relation to the rod 13', here shown as tubular by means of a horizontal arm 33 carried by a mounting cap 34 screw-threaded upon the upper free end of the said rod.

While the form of the invention herein shown and described is believed to be preferable it will be understood that changes may be made therein aside from those herein enumerated without departing from the spirit of the invention, a different form of resilient member being substituted for the washer 26 if desired or the same entirely dispensed with.

What I claim as new is:—

1. A device of the class described comprising a mounting rod, an attaching clamp carried by the said rod, projecting pins at one end of the said rod, a carrying member journaled upon the said rod having receiving notches adapted for adjustably seating over the said pins, a resilient washer having radially projecting fingers overlying the free end of the said carrying member, and an anti-glare shield member carried by the said carrying member.

2. A device of the class described comprising a supporting rod having one end portion thereof rectangular and the other cylindrical in cross-section, a mounting clamp attached to the rectangular portion of the said rod, adjustable spacing means between the said clamp and rod, a carrying member journaled upon the cylindrical portion of the rod having slots in its lower edge, projecting pins carried by the said rod over which the said slots are normally seated, a resilient washer non-rotatably mounted upon the free end of the said cylindrical rod portion having radial resilient fingers normally overlying the upper end of the said carrying member in contact therewith, a cap threaded upon the upper end of the said carrying member overlying the said washer, and an anti-glare member carried by the said carrying member.

In testimony whereof I affix my signature.

ARTHUR C. FREEMAN, Jr.